(12) United States Patent
Patwardhan (10) Patent No.: US 8,914,345 B1
(45) Date of Patent: Dec. 16, 2014

(54) SYSTEMS AND METHODS FOR HOST COMMUNICATION IN A CLUSTERED FILE SYSTEM

(71) Applicant: Kedar Patwardhan, Pune (IN)

(72) Inventor: Kedar Patwardhan, Pune (IN)

(73) Assignee: Symantec Corporation, Mountain View, CA (US)

( * ) Notice: Subject to any disclaimer, the term of this patent is extended or adjusted under 35 U.S.C. 154(b) by 102 days.

(21) Appl. No.: 13/647,063

(22) Filed: Oct. 8, 2012

Related U.S. Application Data

(60) Provisional application No. 61/602,024, filed on Feb. 22, 2012.

(51) Int. Cl.
*G06F 17/30* (2006.01)
(52) U.S. Cl.
CPC .... *G06F 17/30168* (2013.01); *G06F 17/30171* (2013.01)
USPC .......................................................... 707/704
(58) Field of Classification Search
CPC .................... G06F 17/30168; G06F 17/30171
USPC .......................................................... 707/704
See application file for complete search history.

(56) References Cited

U.S. PATENT DOCUMENTS

| 2002/0120763 | A1* | 8/2002 | Miloushev et al. | 709/230 |
| 2009/0327360 | A1* | 12/2009 | Rajaram et al. | 707/204 |
| 2011/0055184 | A1* | 3/2011 | Buban et al. | 707/704 |
| 2012/0072400 | A1* | 3/2012 | Allred et al. | 707/704 |

* cited by examiner

*Primary Examiner* — William Spieler
(74) *Attorney, Agent, or Firm* — ALG Intellectual Property, LLC (57) ABSTRACT

A computer-implemented method for host communication in a clustered file system may include 1) identifying a cluster file system site comprising at least one host that performs data operations on a storage unit, 2) identifying a storage management application that manages the storage unit, 3) transmitting, by an initial host, an initial data operation directed to a location of the storage unit, where the data operation comprises a notification signal that commands the notification of the initial host upon a subsequent host attempting to access the location, 4) transmitting, by the subsequent host, a subsequent data operation directed to the location of the storage unit, and 5) notifying the initial host, by the storage management application, that the subsequent host attempted to access the location of the storage unit. Various other methods, systems, and computer-readable media are also disclosed.

20 Claims, 7 Drawing Sheets

SYSTEMS AND METHODS FOR HOST COMMUNICATION IN A CLUSTERED FILE SYSTEM

CROSS REFERENCE TO RELATED APPLICATION

This application claims the benefit of U.S. Provisional Application No. 61/602,024 filed 22 Feb. 2012, the disclosure of which is incorporated, in its entirety, by this reference.

BACKGROUND

Persons and businesses may implement a variety of strategies to protect valuable data. For example, persons and business may implement cluster computing to access data. Hosts in a cluster may each access underlying data. If one of the hosts fails, then application processing may failover to another host in the cluster. Cluster computing may thereby increasing availability of valuable data.

Similarly, persons and businesses may also implement data mirroring or replication to provide underlying data. Data mirroring or replication may automatically create a copy of designated data. Data mirroring or replication may thereby protect data by creating a redundant backup. In the case of a disaster at one cluster site, data from a replicated copy at another site may be recovered.

Hosts in a cluster may communicate with each other through various means. For example, when hosts share underlying data, the hosts may communicate with each other to coordinate access and locking of the data to preserve consistency of the data. The shared data may include metadata in a cluster virtual file system. Host communication may involve an additional layer of dedicated networking infrastructure that allows direct or substantially direct communication between hosts. The dedicated networking infrastructure may be separate from communication infrastructure through which hosts communicate with an underlying data store.

SUMMARY

As will be described in greater detail below, the instant disclosure generally relates to systems and methods for host communication in a clustered file system. In one example, a computer-implemented method for host communication in a clustered file system may include 1) identifying a cluster file system site including at least one host that performs data operations on a storage unit, 2) identifying a storage management application that manages the storage unit, 3) transmitting, by an initial host, an initial data operation directed to a location of the storage unit, where the data operation includes a notification signal that commands the notification of the initial host upon a subsequent host attempting to access the location, 4) transmitting by a subsequent host a subsequent data operation directed to the location of the storage unit, and 5) notifying the initial host, by the storage management application, that the subsequent host attempted to access the location of the storage unit.

In various embodiments, the storage management application may manage automatic mirroring of data from the storage unit of the cluster file system site to another storage unit of the cluster file system site. The storage management application may also manage automatic replication of data from the storage unit of the cluster file system site to another storage unit of a secondary cluster file system site.

In various embodiments, the initial host may cache data corresponding to the initial data operation on a cache local to the initial host. In response to the notifying by the storage management application, the initial host may determine an up-to-date data operation by analyzing the cache.

In various embodiments, the notification signal may command the notification of the initial host upon a subsequent host attempting to write to the location of the storage unit. In these embodiments, the subsequent data operation from the subsequent host may include a write operation. In other embodiments, the notification signal may command the notification of the initial host upon a subsequent host attempting to read from the location of the storage unit. In those embodiments, the subsequent data operation from the subsequent host may include a read operation or a write operation.

In various embodiments, the method may further include transmitting a command from the initial host to determine whether the location of the storage unit is locked by another host. The method may also include verifying from the initial host that the location of the storage unit is not locked. The initial host may transmit the notification signal in response to verifying that the location of the storage unit is not locked.

In various embodiments, the storage management application may block performance of the initial data operation for at least a period of time in response to the notification signal. The period of time may include at least a period of time beginning at reception of the initial data operation and concluding at reception of the subsequent data operation.

In various embodiments, the storage management application may block performance of the subsequent data operation from the subsequent host for at least another period of time in response to the notification signal. The other period of time may include at least a period of time beginning at reception of the subsequent data operation from the subsequent host and concluding at performance of a valid data operation from the initial host.

In various embodiments, the initial host may encode the notification signal at the physical layer of the open systems interconnection model. The initial host may also encode the notification signal within a protocol for communication between computers and peripheral devices.

The storage management application may lock the location of the storage unit in response to receiving the notification signal such that hosts other than the initial host cannot access the location of the storage unit. The storage management application may also unlock the location of the storage unit upon receiving a response to the notifying from the initial host.

In one embodiment, a system for implementing the above-described method may include 1) an identification module programmed to identify a cluster file system site including at least one host that performs data operations on a storage unit, and programmed to identify a storage management application that manages the storage unit, 2) a transmission module programmed to transmit, by an initial host, an initial data operation directed to a location of the storage unit, where the data operation includes a notification signal that commands the notification of the initial host upon a subsequent host attempting to access the location, and programmed to transmit, by the subsequent host, a subsequent data operation directed to the location of the storage unit, 3) a notification module programmed to notify the initial host, by the storage management application, that the subsequent host attempted to access the location of the storage unit, and 4) at least one processor configured to execute the identification module, the transmission module, and the notification module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a cluster file system site including at least one host that performs data operations on a storage unit, 2) identify a storage management application that manages the storage unit, 3) transmit, by an initial host, an initial data operation directed to a location of the storage unit, where the data operation includes a notification signal that commands the notification of the initial host upon a subsequent host attempting to access the location, 4) transmit, by the subsequent host, a subsequent data operation directed to the location of the storage unit, and 5) notify the initial host, by the storage management application, that the subsequent host attempted to access the location of the storage unit.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for host communication in a clustered file system. As will be explained in greater detail below, the systems and methods described herein may enable hosts in a clustered file system to communicate with each other in a more efficient manner. The systems and methods may enable hosts to communicate with each other through an underlying data store without using a separate dedicated inter-host network structure. Accordingly, the systems and methods described herein may eliminate a redundant layer of network infrastructure while more fully exploiting network communications between hosts and underlying data storage.

Figure 1:
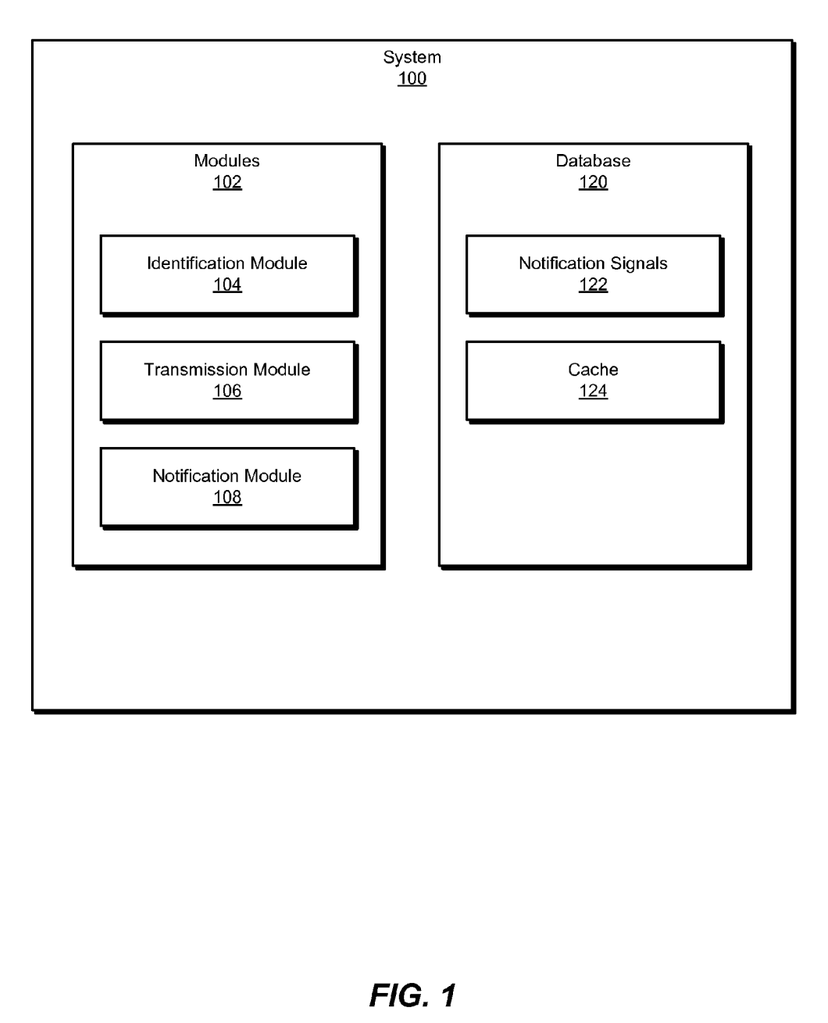
FIG. 1 is a block diagram of an exemplary system for host communication in a clustered file system.
Figure 2:
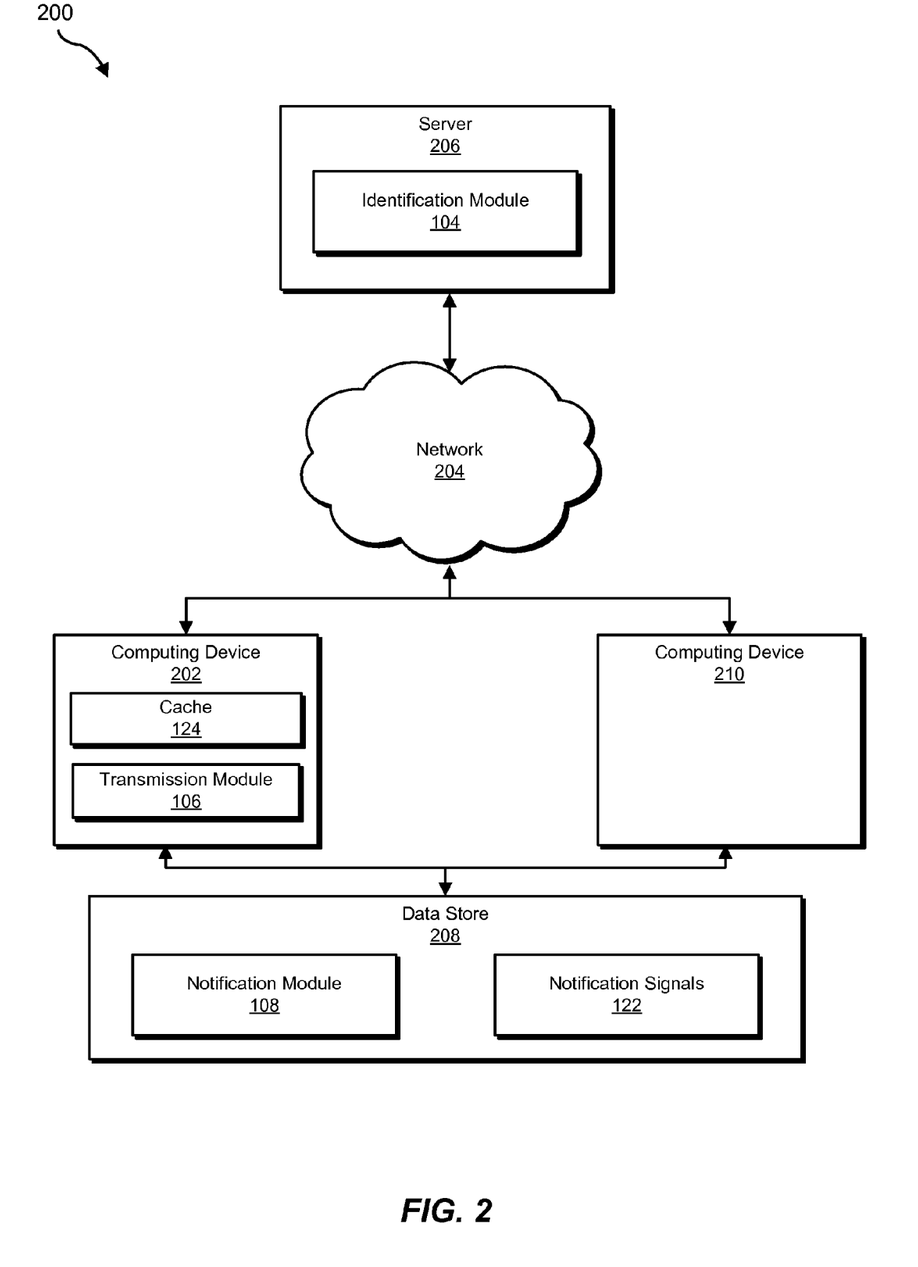
FIG. 2 is a block diagram of an exemplary system for host communication in a clustered file system.

The following will provide, with reference to FIGS. 1-2, detailed descriptions of exemplary systems for host communication in a clustered file system. Detailed descriptions of corresponding computer-implemented methods will also be provided in connection with FIGS. 3 and 5. Moreover, detailed descriptions of an exemplary data packet and data store for host communication in a clustered file system will be provided in connection with FIG. 4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for host communication in a clustered file system. As illustrated in this figure, exemplary system 100 may include one or more modules 102 for performing one or more tasks. For example, and as will be explained in greater detail below, exemplary system 100 may include an identification module 104 programmed to identify a cluster file system site including at least one host that performs data operations on a storage unit. Identification module 104 may also be programmed to identify a storage management application that manages the storage unit.

Exemplary system 100 may also include a transmission module 106 programmed to transmit, by an initial host, an initial data operation directed to a location of the storage unit. The data operation may include a notification signal that commands the notification of the initial host upon a subsequent host attempting to access the location. Transmission module 106 may also be programmed to transmit, by the subsequent host, a subsequent data operation directed to the location of the storage unit.

In addition, and as will be described in greater detail below, exemplary system 100 may include a notification module 108 programmed to notify the initial host that the subsequent host attempted to access the location of the storage unit. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store notification signals 122. Notification signals 122 may include templates or examples of the notification signal transmitted by the initial host through transmission module 106. Notification signals 122 may also include templates or examples of additional or alternative signals that an initial host may transmit to other hosts in a cluster file system environment, as discussed further below. Database 120 may also be configured to store a cache 124. Cache 124 may store data operations, such as read or write operations, that a host executes locally without yet processing on a shared underlying data store.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in host communication in a clustered file system. For example, and as will be described in greater detail below, one or more of modules 102 may cause computing device 202 and/or server 206 to 1) identify a cluster file system site including at least one host that performs data operations on a storage unit, 2) identify a storage management application that manages the storage unit, 3) transmit, by an initial host, an initial data operation directed to a location of the storage unit, where the data operation includes a notification signal that commands the notification of the initial host upon a subsequent host attempting to access the location, 4) transmit, by the subsequent host, a subsequent data operation directed to the location of the storage unit, and 5) notify the initial host, by the storage management application, that the subsequent host attempted to access the location of the storage unit.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 610 in FIG. 6, or any other suitable computing device.

Server 206 generally represents any type or form of computing device that is capable of managing host communication in a clustered file system. Examples of server 206 include, without limitation, application servers and database servers configured to provide various database services and/or run certain software applications. In one embodiment, server 206 is implemented at a data store 208 (e.g. through a storage management application that manages the data store).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

In the example of FIG. 2, server 206 in system 200 may include identification module 104. Server 206 may thereby broadly identify the hosts in the clustered file system and manage host communication between them. Computing device 202 in system 200 may also include cache 124 and transmission module 106. Another part or copy of transmission module 106 may also reside in computing device 210. Computing devices 202 and 210 may correspond to hosts in a cluster at least partially managed by server 206. Computing devices 202 and 210 may both access at least one underlying data store 208. As shown in FIG. 2, computing devices 202 and 210 may share underlying data store 208. Data store 208, or a storage management application that manages data store 208, may include notification module 108 and notification signals 122. As explained further below, computing devices 202 and 210 may communicate with each other through shared data store 208 instead of using a separate layer of dedicated inter-host network infrastructure. By communicating through data store 208, the hosts in the cluster may coordinate the locking of locations on the data store while a host uses a local cache, such as cache 124.

Figure 3:
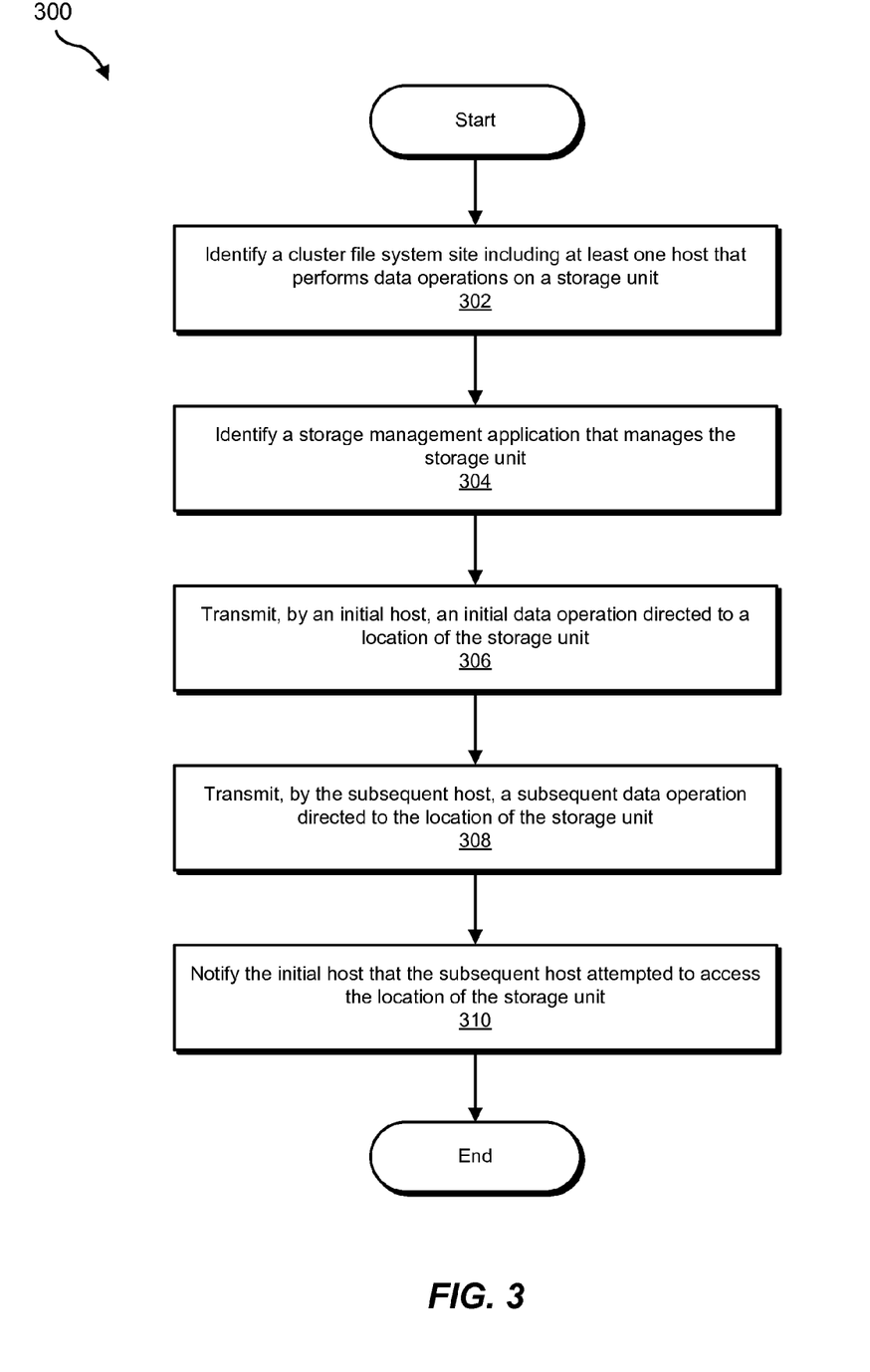
FIG. 3 is a flow diagram of an exemplary method for host communication in a clustered file system.

FIG. 3 is a flow diagram of an exemplary computer-implemented method 300 for host communication in a clustered file system. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

At step 302, one or more of the systems described herein may identify a cluster file system site including at least one host that performs data operations on a storage unit. For example, identification module 104 may identify a cluster file system site including at least one host that performs data operations on a storage unit. As used herein, the term storage unit may refer to any unit of data storage, including a file, directory, volume, partition, storage device, hard disk, hard disk array, etc.

Identification module 104 may identify a cluster file system site in a variety of manners. For example, identification module 104 may receive input operations from hosts in the cluster file system. Identification module 104 may also transmit output operations to hosts in the cluster file system. Identification module 104 may further register each of the hosts in a registry that maintains the cluster file system. Identification module 104 may also identify the cluster file system site by creating, initializing, or installing the cluster file system site.

At step 304, one or more of the systems described herein may identify a storage management application that manages the storage unit. For example, identification module 104 may identify a storage management application that manages the storage unit.

Identification module 104 may identify a storage management application that manages the storage unit in a variety of manners. For example, identification module 104 may perform input and/or output operations to an underlying storage unit. By performing the input and/or output operations, identification module 104 may directly or indirectly identify a storage management application that manages the storage unit. The storage management application may include an application executing at server 206 of system 200, for example. The storage management application may also include software or firmware that manages a hard drive or other data storage device.

The input and/or output operations may be encoded at the physical layer of the open systems interconnection (OSI) model. The input/output operations may also be formatted according to a protocol for communication between computers and peripheral devices. For example, the input/output operations may be formatted according to the SMALL COMPUTER SYSTEM INTERFACE (SCSI) protocol.

Figure 4:
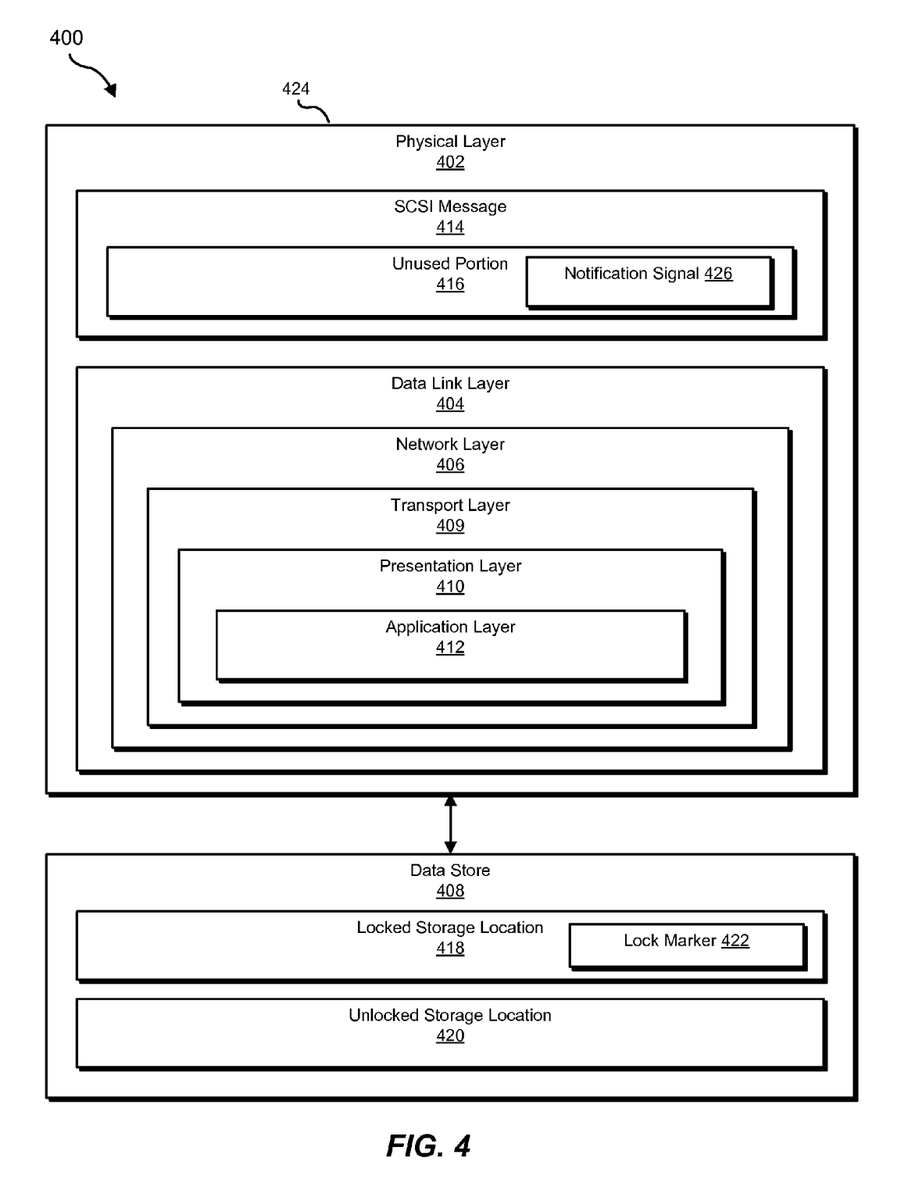
FIG. 4 is a block diagram of an exemplary data packet and data store in an exemplary system for host communication in a clustered file system.

FIG. 4 is a block diagram 400 of an exemplary data packet and data store in an exemplary system for host communication in a clustered file system. As shown in FIG. 4, data packet 424 may include seven layers according to the OSI model, including physical layer 402 and data link layer 404 through application layer 412. Data packet 424 may include an SCSI message 414 at the physical layer 402. The storage management application may generally process input and output operations at the physical layer, like SCSI message 414, between cluster hosts and an underlying storage unit.

The storage management application may manage automatic mirroring of data from the storage unit of the cluster file system site to another storage unit of the cluster file system site. The storage management application may also manage automatic replication of data from the storage unit of the cluster file system site to another storage unit of a secondary cluster file system site.

Returning to FIG. 3, at step 306, one or more of the systems described herein may transmit, by an initial host, an initial data operation directed to a location of the storage unit. As used herein, the term data operation refers to an input, output, read, and/or write operation. The data operation may include a notification signal that commands the notification of the initial host upon a subsequent host attempting to access the location. For example, transmission module 106 may transmit, by an initial host, an initial data operation directed to a location of the storage unit. As used herein, the phrase "location of a storage unit" may refer to a partial or entire file, directory, data block, and/or inode.

Transmission module 106 may transmit the initial data operation directed to a location of the storage unit in a variety of manners. For example, transmission module may transmit the initial data operation at the physical layer of the OSI model. The data operation may include a read operation and/or a write operation. Transmission module 106 may receive the data operation at the initial host from either a local or external application or from another host.

Figure 5:
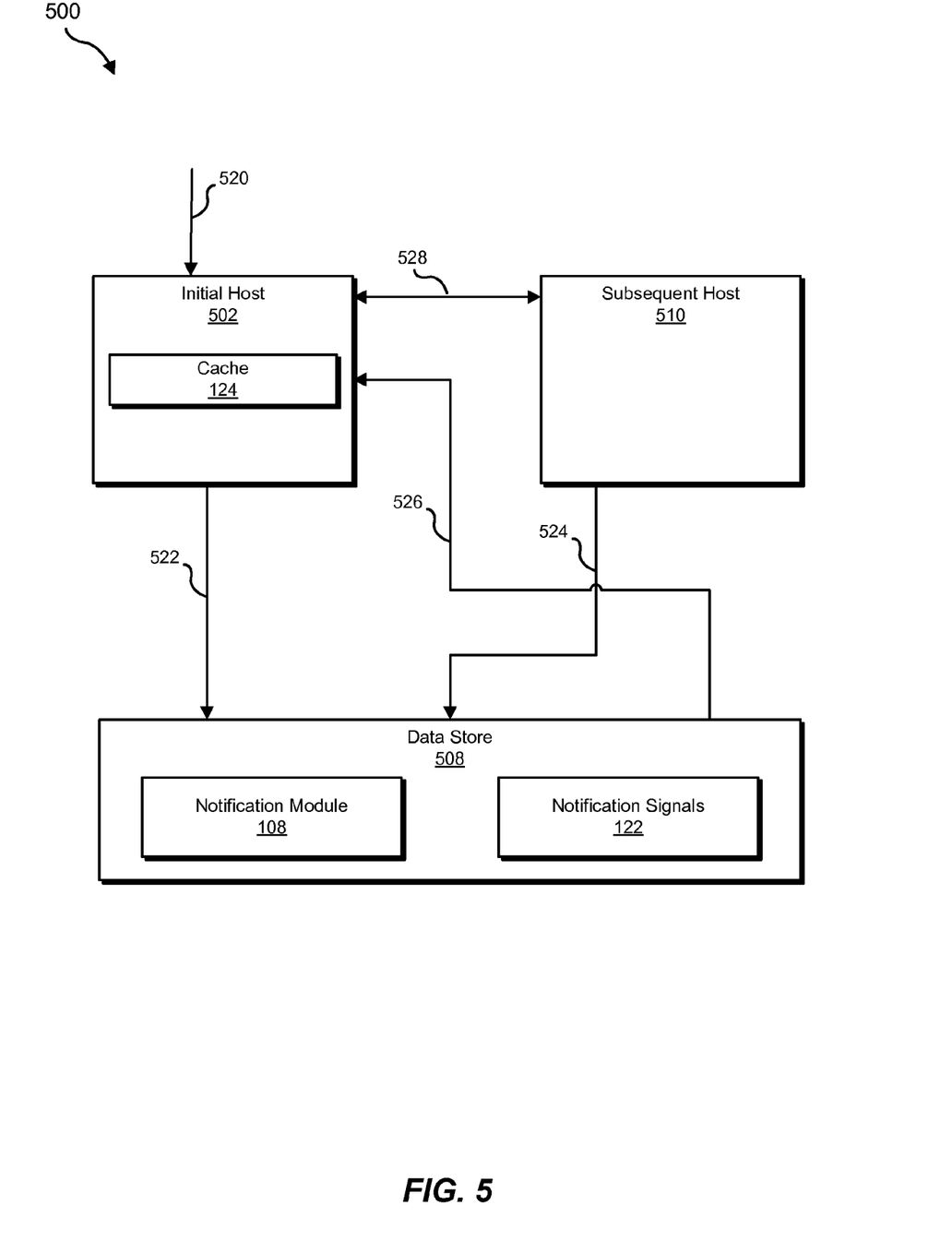
FIG. 5 is a block diagram of an exemplary method for host communication in a clustered file system.

FIG. 5 is a block diagram of an exemplary method for host communication in a clustered file system. As shown in FIG. 5, initial host 502 may receive 520 the initial data operation from an external application or host. Initial host 502 may contain a local cache 124. Transmission module 106 may transmit 522 the initial data operation to a data store 508. Data store 508 may correspond to data store 408 in FIG. 4 and data store 208 in FIG. 2.

The initial host may encode the notification signal at the physical layer of the open systems interconnection model. For example, the initial host may encode the notification signal within input/output messages to a data store managed by the storage management application, as discussed above.

Returning to the example of FIG. 4, data packet 424 may include the initial data operation in the exemplary form of SCSI message 414. As shown in FIG. 4, SCSI message 414 may include a notification signal 426 that commands the notification of the initial host upon a subsequent host attempting to access the location. Notification signal 426 may be included within an otherwise unused portion 416 of SCSI message 414.

Transmission module 106 may also cache data corresponding to the initial data operation on a cache local to the initial host. For example, transmission module 106 may cache data corresponding to the initial data operation within local cache 124. Notification signal 426 may function to lock the location of the storage unit to which the initial data operation is directed. Accordingly, the initial host may freely modify the corresponding data at the local host without concerns about other hosts creating inconsistencies by simultaneously modifying the copy in data store 508.

The notification signal may distinguish between attempts by other hosts to read and write the storage unit location. The notification signal may command the notification of the initial host upon a subsequent host attempting to write to the location of the storage unit. In these embodiments, the subsequent data operation from the subsequent host may include a write operation, but not a read operation. Alternatively, the notification signal may command the notification of the initial host upon a subsequent host attempting to read from the location of the storage unit. In those embodiments, the subsequent data operation from the subsequent host may include both a read operation and a write operation.

Prior to transmitting the initial data operation that includes the notification signal, transmission module 106 may transmit a command from the initial host to determine whether the location of the storage unit is locked by another host. For example, transmission module 106 may transmit a read request to data storage 508 or the storage management application. Transmission module 106 may inspect the location of the storage unit to ascertain whether the location is already locked by another host. For example, transmission module 106 may determine whether the location, such as locked storage location 418 in FIG. 4, includes a lock marker 422. The presence of lock marker 422 may indicate to the initial host that the corresponding location has already been locked by another host. Alternatively, the storage management application may simply report that the location is locked without the initial host inspecting the contents of the storage location. In that case, the location is unavailable to be further locked and accessed by the initial host (e.g. the host inspecting whether the location is locked). As shown in FIG. 4, unlocked storage location 420 does not include a corresponding lock marker, which indicates that storage location 420 has not been locked by another host and is available for locking and further modification. Transmission module 106 may thereby verify that the location of the storage unit is not locked. The initial host may transmit the notification signal in response to verifying that the location of the storage unit is not locked. The storage management application and/or one or more hosts within the cluster may be configured to generally or always check whether a location is already locked before permitting a host to lock the location.

In general, the storage management application may lock the location of the storage unit in response to receiving the notification signal such that hosts other than the initial host cannot access the location of the storage unit. The storage management application may also unlock the location of the storage unit upon receiving a response to the notifying from the initial host at step 310, as discussed below.

At step 308, one or more of the systems described herein may transmit, by the subsequent host, a subsequent data operation directed to the location of the storage unit. For example, transmission module 106 may transmit, by the subsequent host, a subsequent data operation directed to the location of the storage unit.

Transmission module 106 may transmit the subsequent data operation directed to the location of the storage unit in a variety of manners. These manners may generally correspond to the manner in which the initial host transmitted the initial data operation. As shown in FIG. 5, subsequent host 510 may transmit 524 the subsequent data operation after initial host 502 transmitted the initial data operation. Transmission of the subsequent data operation indicates that the subsequent host is attempting to access the same location of the storage unit that the initial host already effectively locked through the notification signal. Accordingly, the initial host may process any pending data operations on the underlying data store 508 and then unlock the location so that the subsequent host may process the subsequent data operation without introducing inconsistencies. Alternatively, if the initial host does not (or cannot) unlock the location of the storage unit, the subsequent data operation from the subsequent host may simply fail.

In some embodiments, the storage management application may block performance of the initial data operation for at least a period of time in response to the notification signal. The storage management application may block performance of the initial data operation to enable the initial host to further modify a copy of the corresponding data within its local cache while the location of the storage unit is locked. Initial host 502 may repeatedly modify and update its local copy of the corresponding data. The initial host may thereby only perform a single, final data operation on data store 508 upon unlocking the location. The period of time of blocking the initial data operation may begin at reception of the initial data operation and conclude after reception of the subsequent data operation from the subsequent host and a further data operation from the initial host indicating that the location is ready to be unlocked.

The storage management application may also block performance of the subsequent data operation from the subsequent host for at least another period of time in response to the notification signal. The other period of time may include at least a period of time beginning at reception of the subsequent data operation from the subsequent host and concluding at performance of a valid or up-to-date data operation from the initial host. In other words, the storage management application may block the subsequent data operation from the subsequent host while the initial host performs housekeeping to update the location of the storage unit based on changes made to a copy of the corresponding data with local cache 126 while the location was locked.

At step 310, one or more of the systems described herein may notify the initial host, by the storage management application, that the subsequent host attempted to access the location of the storage unit. For example, notification module 108 may notify the initial host, by the storage management application, that the subsequent host attempted to access the location of the storage unit.

Notification module 108 may notify the initial host that the subsequent host attempted to access the location of the storage unit in a variety of manners. In one embodiment, the storage management application may notify the initial host in part by processing the initial data operation and reporting its successful completion. In reply, the initial host may transmit an up-to-date data operation, as discussed above. Notification module 108 may transmit the notification based on reception of both the notification signal and the subsequent data operation from the subsequent host. In the example of FIG. 5, data store 508 or the corresponding storage management application may notify 526 the initial host that subsequent host 510 attempted 524 to access the location of the storage unit. Initial host 502 and subsequent host 510 may thereby indirectly communicate with each other through data store 508 to manage locking of locations on data store 508 without use of a dedicated inter-node communication infrastructure 528.

As explained above, the systems and methods described herein may enable hosts in a clustered file system to communicate with each other in a more efficient manner. The systems and methods may enable hosts to communicate with each other through an underlying data store without using a separate dedicated inter-host network structure. Accordingly, the systems and methods described herein may eliminate a redundant layer of network infrastructure while more fully exploiting network connections between hosts and underlying data storage.

Figure 6:
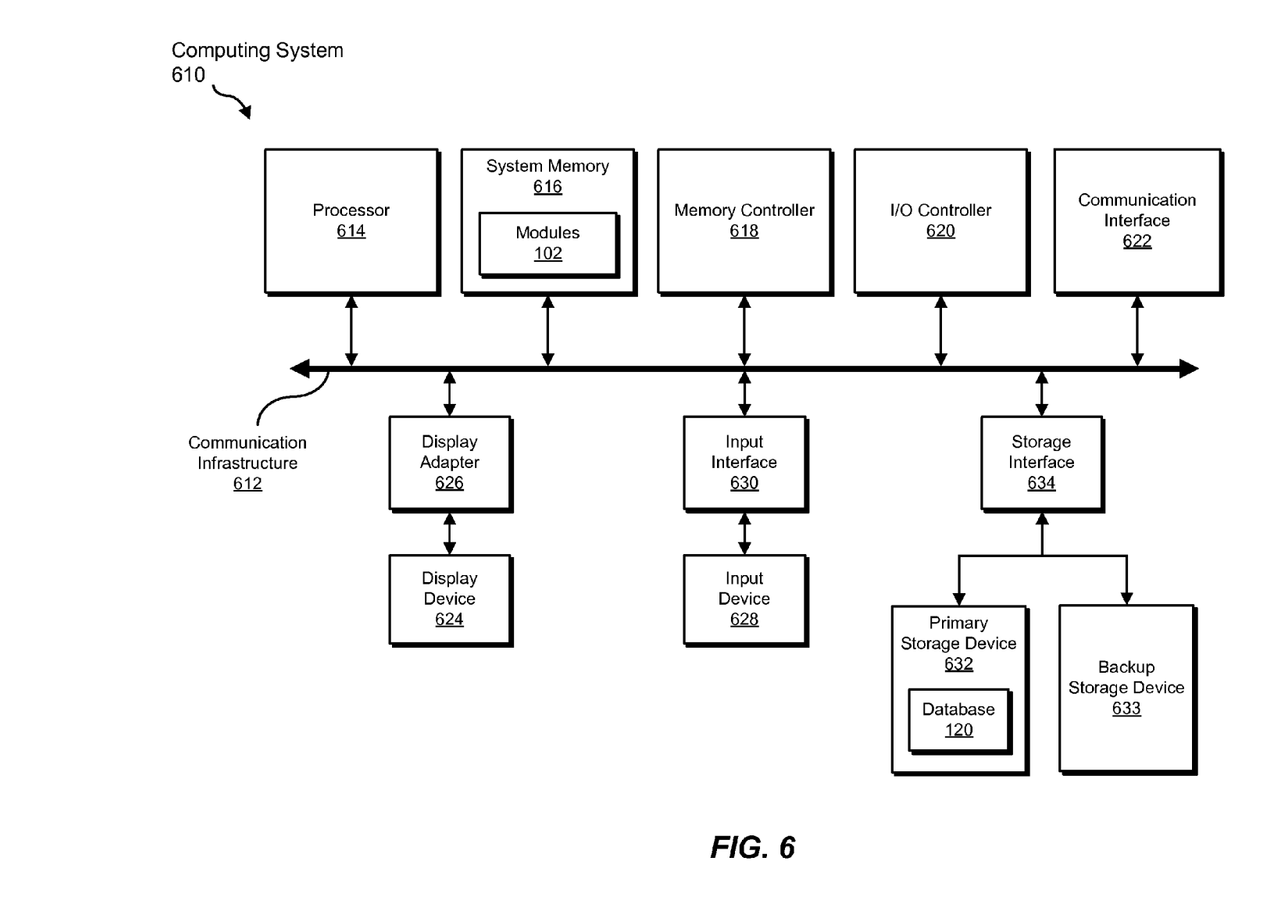
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, transmitting, notifying, managing, mirroring, replicating, caching, commanding, verifying, blocking, performing, analyzing, and encoding steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
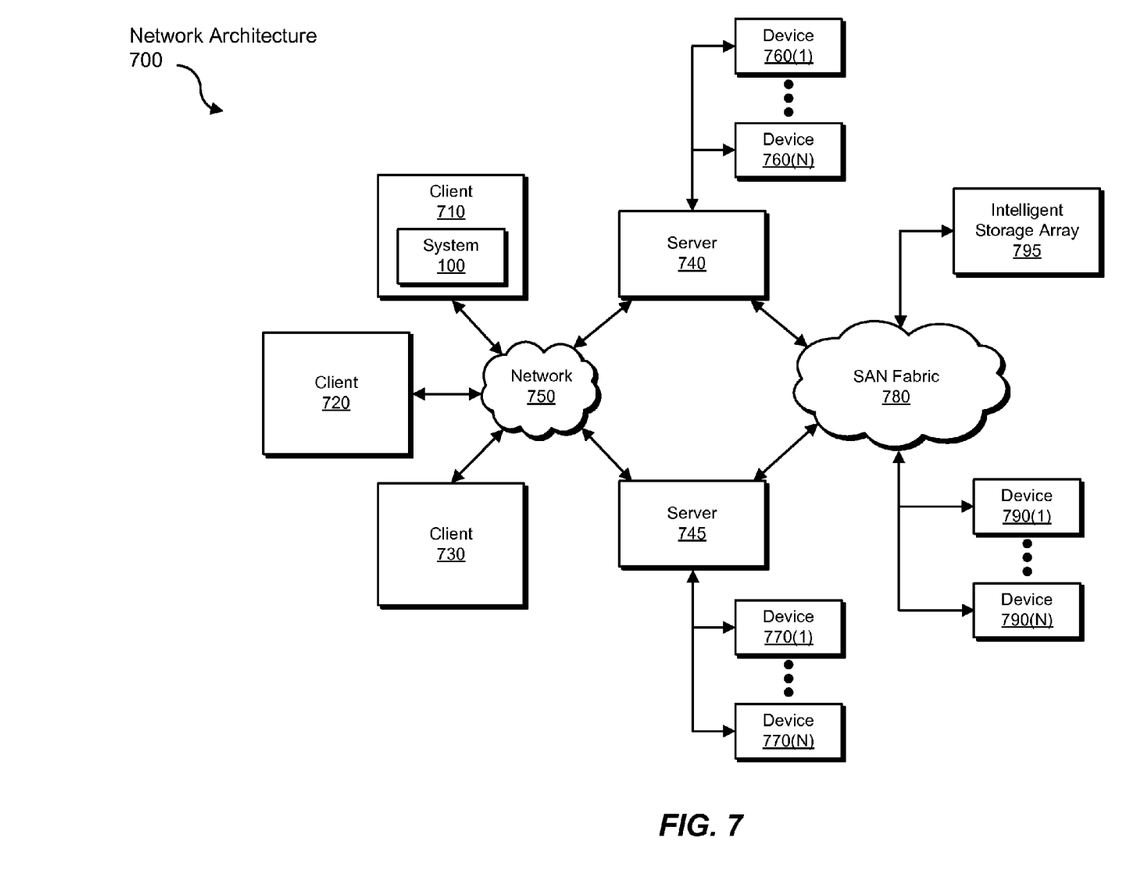
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, transmitting, notifying, managing, mirroring, replicating, caching, commanding, verifying, blocking, performing, analyzing, and encoding steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for host communication in a clustered file system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an initial data operation to be transformed, transform the data operation by including a notification signal within the operation, output a result of the transformation to an underlying data storage, use the result of the transformation to notify an initial host when another host attempts to access a locked location of a storage unit is, and store the result of the transformation within the underlying data store. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for host communication in a clustered file system, at least a portion of the method being performed by a computing device comprising at least one processor, the method comprising:
    identifying a cluster file system site comprising at least one host that performs data operations on a storage unit;
    identifying a storage management application that manages the storage unit;
    transmitting, by an initial host, an initial data operation directed to a location of the storage unit, where the data operation comprises a notification signal that commands the notification of the initial host upon a subsequent host attempting to access the location;
    blocking, by the storage management application, performance of the initial data operation for at least a period of time in response to the notification signal;
    transmitting, by the subsequent host, a subsequent data operation directed to the location of the storage unit;
    in response to detecting the subsequent data operation, notifying the initial host, by the storage management application, that the subsequent host attempted to access the location of the storage unit by stopping the blocking of performance of the initial data operation, processing the initial data operation, and reporting successful completion of the initial data operation.

2. The computer-implemented method of claim 1, wherein the storage management application manages at least one of:
    automatic mirroring of data from the storage unit of the cluster file system site to another storage unit of the cluster file system site;
    automatic replication of data from the storage unit of the cluster file system site to another storage unit of a secondary cluster file system site.

3. The computer-implemented method of claim 1, wherein the initial host caches data corresponding to the initial data operation on a cache local to the initial host.

4. The computer-implemented method of claim 3, wherein the blocking of performance of the initial data operation enables the initial host to further modify a copy, within the cache, of data corresponding to the location of the storage unit while the location of the storage unit is locked.

5. The computer-implemented method of claim 3, wherein the period of time comprises at least a period of time beginning at reception of the initial data operation and concluding at reception of the subsequent data operation.

6. The computer-implemented method of claim 5, wherein the storage management application blocks performance of the subsequent data operation from the subsequent host for at least another period of time in response to the notification signal.

7. The computer-implemented method of claim 6, wherein the other period of time comprises at least a period of time beginning at reception of the subsequent data operation from the subsequent host and concluding at performance of a valid data operation from the initial host.

8. The computer-implemented method of claim 5, wherein, in response to the notifying by the storage management application, the initial host determines an up-to-date operation by analyzing the cache.

9. A system for host communication in a clustered file system, the system comprising:
- an identification module programmed to identify a cluster file system site comprising at least one host that performs data operations on a storage unit, and programmed to identify a storage management application that manages the storage unit;
- a transmission module programmed to:
  - transmit, by an initial host, an initial data operation directed to a location of the storage unit, where the data operation comprises a notification signal that commands the notification of the initial host upon a subsequent host attempting to access the location;
  - transmit, by the subsequent host, a subsequent data operation directed to the location of the storage unit;
  - block, by the storage management application, performance of the initial data operation for at least a period of time in response to the notification signal;
- a notification module programmed to, in response to detecting the subsequent data operation, notify the initial host, by the storage management application, that the subsequent host attempted to access the location of the storage unit by stopping the blocking of performance of the initial data operation, processing the initial data operation, and reporting successful completion of the initial data operation;
- at least one processor configured to execute the identification module, the transmission module, and the notification module.

10. The system of claim 9, wherein the initial host encodes the notification signal at the physical layer of the open systems interconnection model.

11. The system of claim 10, wherein the initial host encodes the notification signal within a protocol for communication between computers and peripheral devices.

12. The system of claim 9, wherein:
- the notification signal commands the notification of the initial host upon the subsequent host attempting to write to the location of the storage unit;
- the subsequent data operation from the subsequent host comprises a write operation.

13. The system of claim 9, wherein:
- the notification signal commands the notification of the initial host upon the subsequent host attempting to read from the location of the storage unit;
- the subsequent data operation from the subsequent host comprises at least one of a read operation and a write operation.

14. The system of claim 9, wherein the notification module is programmed to notify the initial host at least in part by the storage management application locking the location of the storage unit in response to receiving the notification signal such that hosts other than the initial host cannot access the location of the storage unit.

15. The system of claim 14, wherein the notification module is further programmed to unlock, by the storage management application, the location of the storage unit upon receiving a response to the notifying from the initial host.

16. The system of claim 9, wherein the transmission module is further programmed to:
- transmit a command from the initial host to determine whether the location of the storage unit is locked by another host;
- verify from the initial host that the location of the storage unit is not locked.

17. The system of claim 16, wherein the transmission module is further programmed to transmit from the initial host the notification signal in response to verifying that the location of the storage unit is not locked.

18. The system of claim 9, wherein the storage management application manages at least one of:
- automatic mirroring of data from the storage unit of the cluster file system site to another storage unit of the cluster file system site;
- automatic replication of data from the storage unit of the cluster file system site to another storage unit of a secondary cluster file system site.

19. The system of claim 9, wherein the transmission module is programmed to cache data corresponding to the initial data operation on a cache local to the initial host.

20. A non-transitory computer-readable medium comprising one or more computer-executable instructions that, when executed by at least one processor of a computing device, cause the computing device to:
- identify a cluster file system site comprising at least one host that performs data operations on a storage unit;
- identify a storage management application that manages the storage unit;
- transmit, by an initial host, an initial data operation directed to a location of the storage unit, where the data operation comprises a notification signal that commands the notification of the initial host upon a subsequent host attempting to access the location;
- block, by the storage management application, performance of the initial data operation for at least a period of time in response to the notification signal;
- transmit, by the subsequent host, a subsequent data operation directed to the location of the storage unit;
- in response to detecting the subsequent data operation, notify the initial host, by the storage management application, that the subsequent host attempted to access the location of the storage unit by stopping the blocking of performance of the initial data operation, processing the initial data operation, and reporting successful completion of the initial data operation.

* * * * *